(12) United States Patent
Jegou et al.

(10) Patent No.: US 12,276,770 B2
(45) Date of Patent: Apr. 15, 2025

(54) RESOLUTION IMPROVEMENT IN DUAL ENERGY

(71) Applicant: SMITHS DETECTION FRANCE S.A.S., Vitry-sur-Seine (FR)

(72) Inventors: Guillaume Jegou, Vitry-sur-Seine (FR); Sébastien Grabeuil, Vitry-sur-Seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 364 days.

(21) Appl. No.: 17/908,424

(22) PCT Filed: Mar. 2, 2021

(86) PCT No.: PCT/GB2021/050521
§ 371 (c)(1),
(2) Date: Aug. 31, 2022

(87) PCT Pub. No.: WO2021/176207
PCT Pub. Date: Sep. 10, 2021

(65) Prior Publication Data
US 2023/0089927 A1    Mar. 23, 2023

(30) Foreign Application Priority Data
Mar. 3, 2020  (GB) .................................. 2003046

(51) Int. Cl.
*G01V 5/22*   (2024.01)
*G06T 5/40*   (2006.01)
(Continued)

(52) U.S. Cl.
CPC ............... *G01V 5/224* (2024.01); *G06T 5/40* (2013.01); *G06T 7/0002* (2013.01);
(Continued)

(58) Field of Classification Search
CPC ................. G06T 5/40; G06T 7/0002; G06T 2207/30112; G06T 5/92;
(Continued)

(56) References Cited

U.S. PATENT DOCUMENTS

2010/0128844 A1   5/2010  Thomsen et al.
2014/0233692 A1*  8/2014  Case ................... G06F 3/04842
                                                              715/781

FOREIGN PATENT DOCUMENTS

WO    2005084351 A2    9/2005

OTHER PUBLICATIONS

International Search Report and Written Opinion, PCT/GB2021/050521, mailing date: Apr. 29, 2021, 12 pages.
(Continued)

*Primary Examiner* — David P Porta
*Assistant Examiner* — Meenakshi S Sahu
(74) *Attorney, Agent, or Firm* — Armstrong Teasdale LLP (57) ABSTRACT

In some embodiments, a method for processing inspection data associated with cargo irradiated by a plurality N of pulses of inspection is provided. The method includes obtaining the inspection data, the inspection data being representative of intensity values of pixels of an inspection image of the including data associated with a higher energy mode, and data associated with a lower energy mode; generating a histogram having, as a first axis, bins corresponding to pixel intensity values HM associated with the higher energy mode and, as a second axis, bins corresponding to pixel intensity values LM associated with the lower energy mode; selecting a bin corresponding to a most frequent bin of the pixel intensity values HM; and generating a transformation table by mapping each bin of the pixel intensity values LM with the selected bin of the pixel intensity values HM.

17 Claims, 3 Drawing Sheets

(51) Int. Cl.
　　　*G06T 7/00*　　　　(2017.01)
　　　*G06V 10/50*　　　(2022.01)
　　　*H04N 25/46*　　　(2023.01)

(52) U.S. Cl.
　　　CPC ........... *G06V 10/507* (2022.01); *H04N 25/46* (2023.01); *G06T 2207/30112* (2013.01)

(58) Field of Classification Search
　　　CPC . G06T 2207/10116; G06T 2207/20216; G06T 2207/20221; G06T 7/0004; G06V 10/507; H04N 25/46
　　　See application file for complete search history.

(56) References Cited

OTHER PUBLICATIONS

Ogorodnikov S et al: "Processing of interlaced images in 4-10 MeV dual energy customs system for material recognition", Physical Review Special Topics. Accelerators and Beams, American Physical Society, Ridge, NY, US, vol. 5, No. 10, Oct. 1, 2002 (Oct. 1, 2002), pp. 104701-104711, XP002426265, ISSN: 1098-4402, DOI: 10.1103/PHYSREVSTAB.5.104701.

U.K. Search Report, GB2003046.6, mailing date: Aug. 11, 2020, 3 pages.

* cited by examiner

| LM(x) | HM(x)=LM'(x) |
|---|---|
| LM0 | HM0 |
| LM1 | HM1 |
| LM2 | HM2 |
| LM3 | HM3 |
| LM4 | HM4 |

RESOLUTION IMPROVEMENT IN DUAL ENERGY

CROSS-REFERENCE TO RELATED APPLICATIONS

This application is a national stage application of PCT/GB2021/050521 filed on Mar. 2, 2021, which claims priority to GB Application No. 2003046.6 filed on Mar. 3, 2020, the disclosures of which are hereby incorporated by reference herein in their entirety as part of the present application.

BACKGROUND

The disclosure relates but is not limited to methods for processing inspection data associated with cargo irradiated by a plurality of pulses of inspection radiation. The disclosure also relates to associated devices and computer program products.

Some accelerators have a dual energy mode, for example for use for material discrimination. The accelerators are used to irradiate cargo with a lower energy mode and with a higher energy mode. Transmission levels of the modes are different for a given cargo, and the material of the cargo may be determined.

BRIEF DESCRIPTION

Aspects and embodiments of the disclosure are set out in the appended claims. These and other aspects and embodiments of the disclosure are also described herein.

BRIEF DESCRIPTION OF DRAWINGS

Embodiments of the disclosure will now be described, by way of example only, with reference to the accompanying drawings, in which.

In the Figures like reference numerals are used to indicate like elements.

DETAILED DESCRIPTION OVERVIEW

In some embodiments of the disclosure, there is provided a method for processing inspection data obtained from inspection of cargo using higher energy mode data and lower energy mode data. The method may include generating a histogram showing occurrences, in the inspection data, of pixels (i) with a given intensity associated with the higher energy mode data and (ii) with a given intensity associated with the lower energy mode data. The generated histogram may be used to associate each given intensity associated with the lower energy mode data to a corresponding most frequent intensity associated with the higher energy mode data. A transformation table mapping the associated intensities may be generated. The transformation table may be used to determine a transformed intensity corresponding to the higher energy mode data by transforming an intensity associated with the lower energy mode data.

Embodiments of the disclosure enable to use the transformed intensities in combination with available intensities associated with the higher energy mode data. Alternatively or additionally, embodiments of the disclosure may enable to effectively double acquisition frequency during inspection. Alternatively or additionally, embodiments of the disclosure may enable to double image resolution in a direction of scanning during inspection. Alternatively or additionally, embodiments of the disclosure enable to improve quality of the inspection image by using the combined intensities. Alternatively or additionally, embodiments of the disclosure enable faster scans during inspection.

Alternatively or additionally, as already stated, embodiments of the disclosure enable to generate the transformation table using the inspection data obtained from the inspection of the cargo itself. Alternatively or additionally, embodiments of the disclosure enable the transformation table to remain accurate, even if, for the cargo, the inspection radiation changes, due for example to inspection system aging, radiation source energy variation, detectors replacement, addition of a filter, etc. Alternatively or additionally, embodiments of the disclosure may enable avoiding a need for a calibration using calibration devices of different materials and/or thicknesses to generate transformation tables. Alternatively or additionally, embodiments of the disclosure may enable to improve reliability of the generated transformation table.

DETAILED DESCRIPTION OF EXAMPLE EMBODIMENTS

Figure 1:
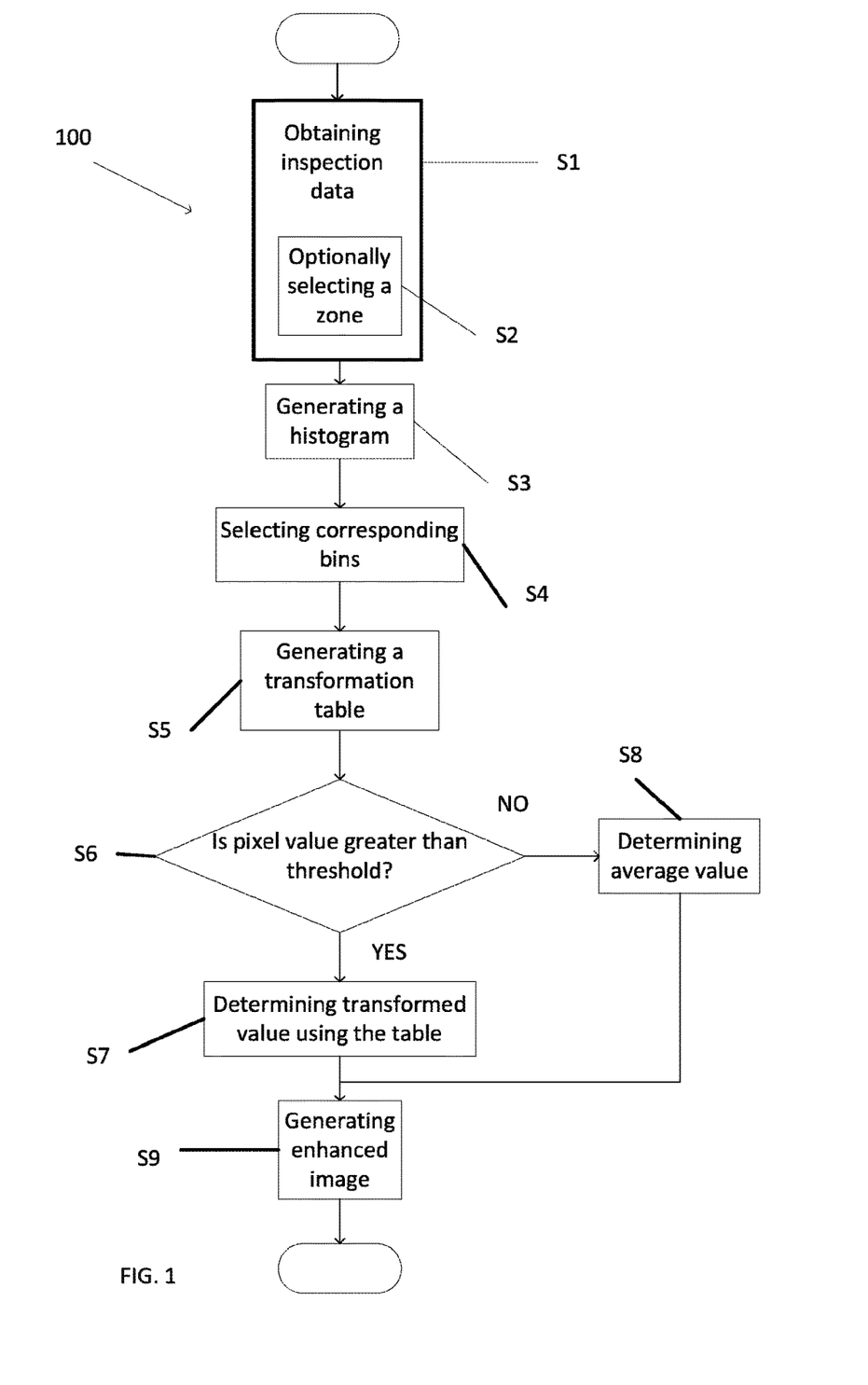
FIG. 1 schematically represents a flowchart of an example method according to the disclosure.

FIG. 1 schematically represents a flowchart of an example method 100 according to the disclosure. The method 100 of FIG. 1 may be used for processing inspection data associated with cargo irradiated by a plurality N of pulses of inspection radiation.

In some examples the inspection data may be representative of intensity values of pixels of an inspection image of the cargo. The inspection image may be generated as a result of a plurality of detectors detecting the plurality N of pulses transmitted through the cargo.

In examples using a dual energy mode, the inspection data includes data associated with a higher energy mode, and data associated with a lower energy mode.

In some examples, the data associated with the higher energy mode includes data generated using a pulse of a higher energy mode (e.g. by a radiation source generating the pulses of inspection radiation), and the data associated with the lower energy mode includes data generated using a pulse of a lower energy mode. In these examples, the radiation source may be configured to generate pulses with a lower energy, such as an energy of substantially 4 MeV, and pulses with a higher energy, such as an energy of substantially 6 MeV. Other values of energy for each of the modes may be envisaged.

In some examples, the plurality N of pulses includes duplets of inspection radiation, each duplet of inspection radiation including a pulse of higher energy mode, and a pulse of lower energy mode. In some examples, the radiation source may be configured to generate the pulses with a lower energy and higher energy alternately, i.e. a pulse of lower energy following a pulse of higher energy, and vice versa. Alternatively or additionally, the radiation source may be configured to generate the pulses with a lower energy and higher energy following a sequence different from an alternate sequence, i.e. two pulses of higher energy following each other before and after a pulse of lower energy. Other sequences of pulses of higher energy and lower energy may be envisaged.

Alternatively or additionally, in some examples, the data associated with the higher energy mode includes data generated using a detector including a higher energy mode, and the data associated with the lower energy mode includes data generated using a detector including a lower energy mode. In these examples, the radiation source may be configured to generate pulses with a given energy, such as an energy of between 4 MeV-6 MeV (other values of energy for the given energy may be envisaged), and each pulse with given higher energy is detected by two detectors, i.e. both the detector including a higher energy mode and the detector including a lower energy mode.

The method 100 of FIG. 1 includes obtaining, at S1, the inspection data. The method 100 also includes generating, at S3, a histogram.

Figure 2:
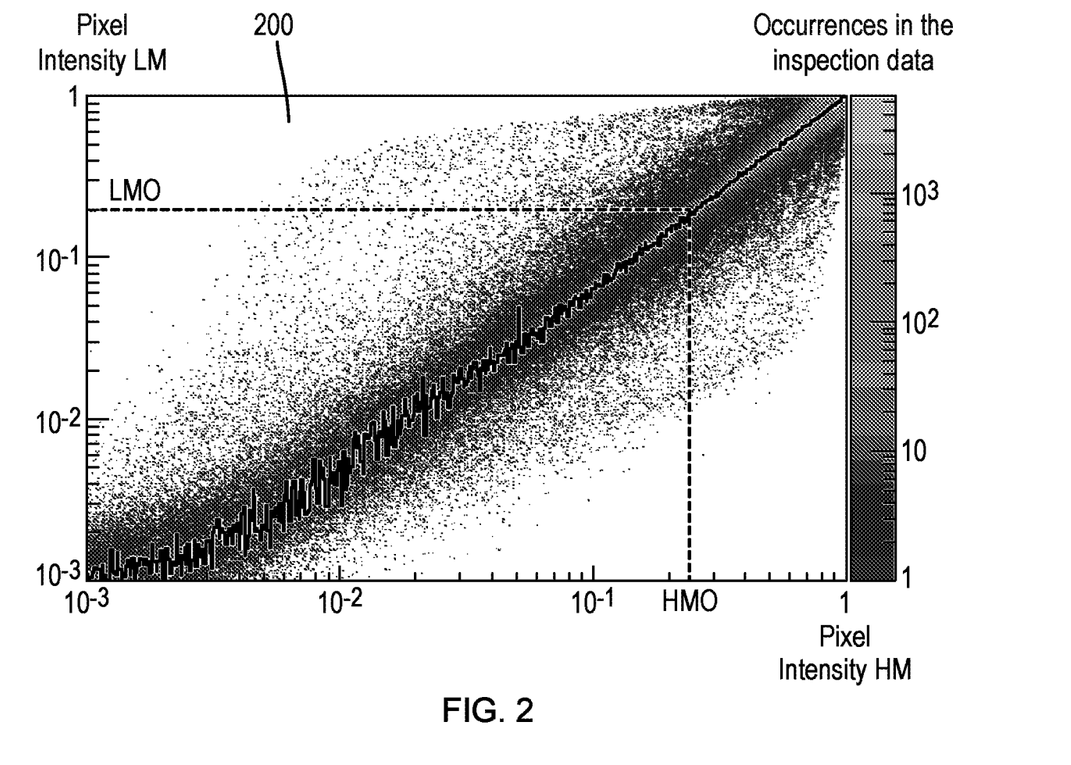
FIG. 2 schematically represents an example histogram according to the disclosure.

FIG. 2 schematically represents an example histogram 200 according to the disclosure. The histogram of FIG. 2 has as a first axis, bins corresponding to pixel intensity values HM associated with the higher energy mode and, as a second axis, bins corresponding to pixel intensity values LM associated with the lower energy mode.

As schematically represented on the scale on the right hand side of FIG. 2, generating at S2 the histogram 200 includes binning, for each pixel (i,j) of the inspection image corresponding to each pulse i and each detector j of the plurality of detectors, an occurrence in the obtained inspection data such that:

$$\left\{HM(i, j); \frac{LM(i-1, j) + LM(i+1, j)}{2}\right\}.$$

A thickness of the inspected cargo with respect to transmission of pulses is assumed to be constant between pulses (i−1), i and (i+1). As stated above, HM(i,j) corresponds to the pixel intensity value of pixel (i,j) associated with the higher energy mode, such as a higher energy pulse i in some examples. Similarly, LM(i−1,j) and LM(i+1,j) correspond, respectively, to the pixel intensity value of pixels (i−1,j) and (i+1,j) associated with the lower energy mode, such as lower energy pulses (i−1) or (1+1) in some examples.

The expression:

$$\frac{LM(i-1, j) + LM(i+1, j)}{2}$$

corresponds to an average of intensities associated with two lower modes and corrects small thickness transitions.

After the histogram of FIG. 2 is generated, the method 100 may proceed to selecting, at S4, on the generated histogram, for each bin of the pixel intensity values LM, a bin corresponding to a most frequent bin of the pixel intensity values HM. Dash lines on FIG. 2 represent steps of S4. On the generated histogram 200, for the bin of the pixel intensity values LM0, a bin HM0 corresponding to the most frequent bin of the pixel intensity values HM is selected.

Figure 3:
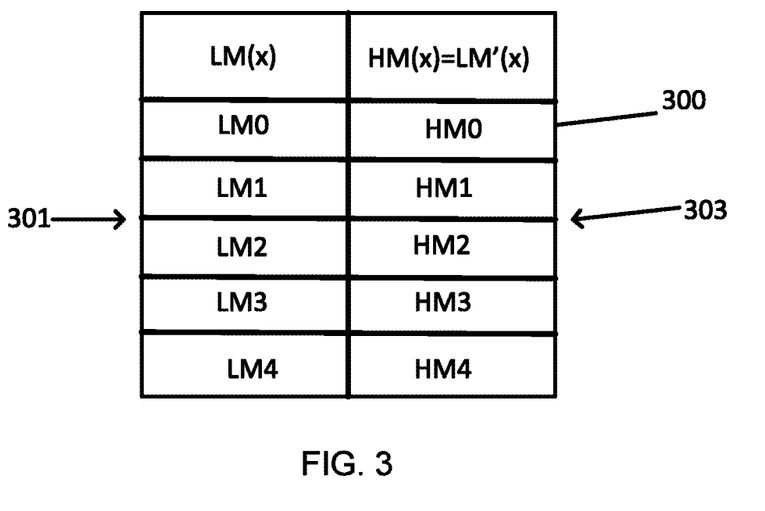
FIG. 3 schematically represents an example transformation table according to the disclosure.

The method 100 of FIG. 1 also includes generating, at S5, a transformation table by mapping each bin of the pixel intensity values LM with the selected bin of the pixel intensity values HM. FIG. 3 schematically represents an example transformation table 300 according to the disclosure. The transformation table 300 of FIG. 3 includes on a column with pixel intensity values LM and a corresponding column with mapped pixel intensity values HM (=LM').

Embodiments of the disclosure enable to generate the transformation table using the inspection data obtained from the inspection of the cargo itself. Alternatively or additionally, as already stated, embodiments of the disclosure enable the transformation table to remain accurate, even if, for the cargo, the inspection radiation changes, due for example to inspection system aging, radiation source energy variation, detectors replacement, addition of a filter, etc. Alternatively or additionally, embodiments of the disclosure may enable avoiding a need for a calibration using calibration devices of different materials and/or thicknesses to generate transformation tables. Alternatively or additionally, embodiments of the disclosure may enable to improve reliability of the generated transformation table.

As illustrated in FIG. 3, the method may be such that determining the transformed pixel intensity value LM' may include interpolating mapped bins in the generated transformation table 300. For example, for a pixel intensity value LM(x) 301 between LM1 and LM2, the transformed pixel intensity value LM' (x) 303 may be interpolated using HM1 and HM2.

The method of FIG. 1 may also include determining at S6, for each pixel of the inspection image associated with the lower energy mode, whether the intensity value is greater than a predetermined threshold. The predetermined threshold may be substantially equal to e.g. 0.01. Other values of the predetermined threshold are envisaged. The predetermined threshold may be set by a user of an inspection system on which the inspection of the cargo is performed. In some examples, the predetermined threshold enables to ensure that the intensity value associated with the lower energy mode is not too low to be used, because e.g. a pulse with a lower energy is not penetrating the cargo enough.

If it is determined at S6 that the intensity value is greater than a predetermined threshold, the method 100 of FIG. 1 may include, for each pixel having an intensity value greater than the predetermined threshold, determining at S7 a transformed pixel intensity value LM' corresponding to a pixel intensity value HM, using the generated transformation table 300 as shown in FIG. 3.

If it is determined at S6 that the intensity value is smaller than a predetermined threshold, the method 100 of FIG. 1 may include determining at S8 an average pixel intensity value HM' corresponding to a pixel intensity value HM such that:

$$HM'(i, j) = \frac{HM(i-1, j) + HM(i+1, j)}{2}.$$

The method 100 of FIG. 1 may further include generating, at S9, an enhanced inspection image using the pixel intensity values HM associated with the higher energy mode and at least one of the determined transformed pixel intensity values LM' and/or the determined average pixel intensity values HM'.

Embodiments of the disclosure enable to use the transformed intensities in combination with available intensities associated with the higher energy mode data. Alternatively or additionally, embodiments of the disclosure may enable to effectively double acquisition frequency during inspection. Alternatively or additionally, embodiments of the disclosure may enable to double image resolution in a direction of scanning during inspection. Alternatively or additionally, embodiments of the disclosure enable to improve quality of the inspection image by using the combined intensities. Alternatively or additionally, embodiments of the disclosure enable faster scans during inspection.

In some examples, a tanh function may be used and provide a smooth transition between predetermined uses of LM' and HM' in the enhanced inspection image. The predetermined uses of LM' and HM' may be determined by the user of the inspection system. Other functions than a tanh function may also be envisaged.

Below is explained an example use of a tanh function.

As already stated above, if it is determined at S6 that the intensity value associated with the LM mode is above the predetermined threshold, there is enough intensity value associated with the LM mode for using the transformation table. The transformation table may be used to determine LM'. If it is determined at S6 that the intensity value associated with the LM mode is below the predetermined threshold, there is not enough intensity value associated with the LM mode and the transformation table may not be used. There is more intensity in the pixels corresponding to the higher mode HM. The average pixel intensity value HM' corresponding to the pixel intensity value HM as described above may be used.

Let T be the predetermined threshold value. S may be a pixel intensity value associated with the lower energy mode. W may be a predetermined width of a transition zone between the predetermined use of LM' and the predetermined use of HM' in the enhanced inspection image. The width W may thus be chosen by the user of the inspection system on which the inspection of the cargo is performed. LM' is the intensity value calculated from the transition table corresponding to S as described above, and HM' is the average corresponding to S as described above.

For each pixel intensity value S in the obtained inspection image, a pixel value V used in the enhanced inspection image maybe such that:

$$V = \frac{1}{2}HM' \times \left(\tanh\left(\frac{(T-S)}{W}\right) + 1\right) + \frac{1}{2}LM' \times \left(\tanh\left(\frac{(S-T)}{W}\right) + 1\right)$$

When the pixel intensity value S is far below the threshold T, we have $$\tanh\left(\frac{(S-T)}{W}\right) + 1 \approx 0,$$

such that HM' may be used in the enhanced image.

When the pixel intensity value S is far above the threshold T, we have $$\tanh\left(\frac{(T-S)}{W}\right) + 1 \approx 0,$$

such that LM' may be used in the enhanced image.

The cargo to be inspected may include different materials or different thicknesses with respect to transmission of pulses. Alternatively or additionally, the user of the inspection system on which the inspection of the cargo is performed may be interested in a part only of the cargo. Alternatively or additionally, the image of the cargo may include different features due to angular properties of the pulses of inspection radiation. In the method 100 of FIG. 1, obtaining the data at S1 may further include an optional step of selecting, at S2, in the inspection data, at least one zone associated with a part of the image.

Selecting at S2 may include selecting, in the inspection data, at least one zone associated with a part of the cargo having a constant material for the plurality N of pulses. In cases where the cargo to be inspected includes different materials, the at least one zone associated with a part of the image may be selected such that a histogram may be generated for each zone having a constant material.

Alternatively or additionally, the part of the image may be associated with a part of the cargo having a constant thickness for the plurality N of pulses. In cases where the cargo to be inspected includes different thicknesses, the at least one zone associated with a part of the image may be selected such that a histogram may be generated for each zone having a constant thickness.

Alternatively or additionally, the at least one zone associated with a part of the image may be selected such that a histogram may be generated for each zone in which the user of the inspection system is interested.

Alternatively or additionally, the part of the image may be associated with at least one of: an upper part of the image, a middle part of the image, a lower part of the image. In cases where the image of the cargo includes different features due to the angular properties of the pulses of inspection radiation, different histograms may be generated for different parts of the image.

In some examples, it may be that the inspection data is incomplete, e.g. because no pixel has a normalized signal between 0.01 and 0.02. In example methods of the disclosure, obtaining the inspection data may further include obtaining further data. In some examples, the further data may include inspection data representative of intensity values of pixels of a further inspection image of extra cargo generated as a result of scanning the extra cargo by transmitting a plurality of pulses through the extra cargo. Alternatively or additionally, the further data may include calibration data representative of intensity values of pixels of a calibration image generated as a result of scanning a calibration device by transmitting a plurality N of pulses through the calibration device.

In some examples, in order to estimate a most probable HM for a given LM from the histogram, the bins of the histogram may be selected as explained below.

A bin size may be selected to be small enough to enable determining an accurate most probable HM, but large enough to contain many pixels. In some examples a bin size for a range of intensities may depend on a number of pixels of the inspection image within the range of intensities. In other words, the bin size may be smaller for ranges of intensities with a large number of image pixels in the inspection image, and may be larger elsewhere.

Figure 4:
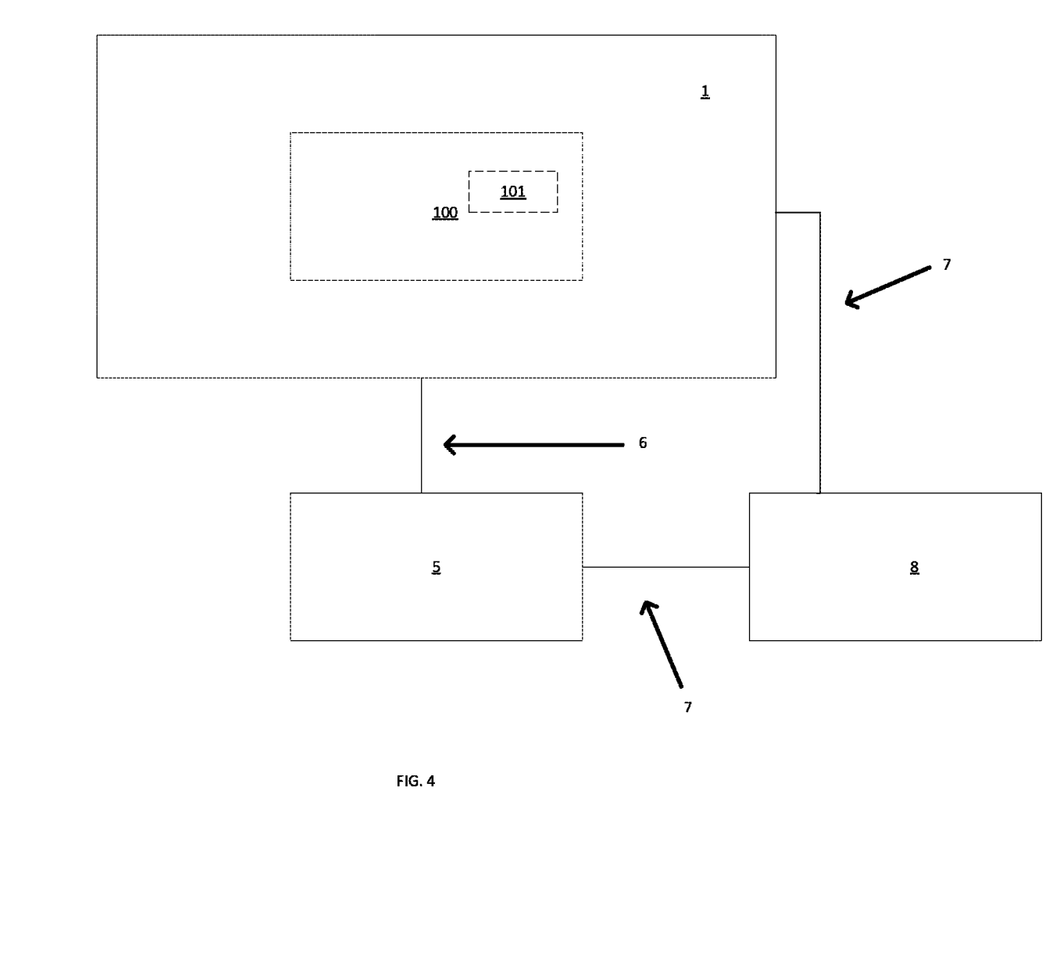
FIG. 4 schematically illustrates an inspection system including an analyser configured to perform, at least partly, a method according to any aspect of the disclosure.

FIG. 4 illustrates an inspection system 1 including an analyser 5 configured to perform, at least partly, a method according to any aspect of the disclosure. In FIG. 4 the cargo 101 to be inspected is located in a container 100. The inspection system 1 of FIG. 4 may be configured to generate the inspection data according to any aspects of the disclosure.

The analyser 5 may be configured to receive the inspection data from the system 1, for example over a communication network 6 which may be wired and/or may be wireless. The analyser 5 conventionally includes at least a processor and a memory in order to carry out an example method according to the disclosure.

The inspection system 1 is configured to inspect the container 100. In some non-limiting examples, the inspection may be performed by transmission of inspection radiation from an inspection radiation source to the detectors through the container 100.

In the example illustrated by FIG. 4, a communication server 8 may be configured to communicate, via a communication network 7 which may be wired and/or may be wireless, with the system 1 and/or the analyser 5. In some examples, the communication server 8 may be configured to provide a remote data management system. In some examples the server 8 may include a database. The database may be configured to store the inspection data and/or the further data of any aspects of the disclosure.

Similarly the analyser 5 may be configured to store the inspection data and/or the further data of any aspects of the disclosure.

Variations and Modifications

It is understood that the inspection radiation source may include sources of other radiation, such as, as non-limiting examples, sources of ionizing radiation, for example gamma rays or neutrons. The inspection radiation source may also include sources which are not adapted to be activated by a power supply, such as radioactive sources, such as using Co60 or Cs137.

As one possibility, there is provided a computer program, computer program product, or computer readable medium, including computer program instructions to cause a programmable computer to carry out any one or more of the methods described herein. In example implementations, at least some portions of the activities related to the analyser 5 herein may be implemented in software. It is appreciated that software components of the present disclosure may, if desired, be implemented in ROM (read only memory) form. The software components may, generally, be implemented in hardware, if desired, using conventional techniques.

In some examples, components of the analyser 5 and/or the communications networks 6 and/or 7 may use specialized applications and hardware.

As will be apparent to the skilled in the art, the server 8 and/or the analyser 5 should not be understood as a single entity, but rather refers to a physical and/or virtual device including at least a processor and a memory, the memory may be in one or more servers which can be located in a single location or can be remote from each other to form a distributed network (such as "server farms", e.g., using wired or wireless technology).

In some examples, one or more memory elements (e.g., the database and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The communications network 6 and the communications network 7 may form only one network.

The data received by the analyser 5 may be typically received over a range of possible communications networks 6 and/or 7 at least such as: a satellite based communications network; a cable based communications network; a telephony based communications network; a mobile-telephony based communications network; an Internet Protocol (IP) communications network; and/or a computer based communications network.

In some examples, the communications networks 6 and/or 7 and/or the analyser 5 may include one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The container 100 may be any type of container, such as a holder, a vessel, or a box, etc. The container 100 may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the container 100 may be a "shipping container" (such as a tank or an ISO container or a non-ISO container or a Unit Load Device (ULD) container). It is thus appreciated that the container 100 may be any type of container, and thus may be a suitcase in some examples. The radiation source is configured to cause inspection of the cargo 101 through the material (usually steel) of walls of the container 100, e.g. for detection and/or identification of the cargo 101.

The system 1 is configured to, in the inspection mode, cause inspection of the container 100, in totality (i.e. the whole container 100 is inspected) or partially (i.e. only a chosen part of the container is inspected, e.g., typically, when inspecting a vehicle, a cabin of the vehicle may not be inspected, whereas a rear part of the vehicle is inspected).

The inspection system 1 may be mobile and may be transported from a location to another location (the system 1 may include an automotive vehicle). Alternatively or additionally, the inspection system 1 may be static with respect to the ground and cannot be displaced.

The inspection radiation source may include an X-ray generator. The energy of the X-rays may be between 100 keV and 15 MeV, and the dose may be between 2 mGy and 20 Gy (Gray). For a mobile inspection system, the power of the X-ray source may be e.g., between 100 keV and 9.0 MeV, typically e.g., 2 MeV, 3.5 MeV, 4 MeV, or 6 MeV, for a steel penetration capacity e.g., between 40 mm to 400 mm, typically e.g., 300 mm (12 in). For a mobile inspection system, the dose may be e.g., between 20 mGy and 120 mGy. For a static inspection system, the power of the X-ray source may be e.g., between 4 MeV and 10 MeV, typically e.g., 9 MeV, for a steel penetration capacity e.g., between 300 mm to 450 mm, typically e.g., 410 mm (16.1 in). For a static inspection system, the dose may be 17 Gy.

The detectors may include, amongst other conventional electrical elements, radiation detection lines, such as X-ray detection lines. The detectors may further include other types of detectors, such as optional gamma and/or neutrons detectors, e.g., adapted to detect the presence of radioactive gamma and/or neutrons emitting materials within the container 100, e.g., simultaneously to the X-ray inspection. For a mobile inspection system, the detectors may also include an electro-hydraulic boom which can operate in a retracted position in a transport mode and in an inspection position. The boom may be operated by hydraulic activators (such as hydraulic cylinders). For a static inspection system, the detectors may also include a structure and/or gantry. The detection lines may be mounted on the boom or structure and/or gantry, facing the source on the other side of the container 100.

In order to inspect the container 100, the system 1 may include a motion generation device so that the system 1 may be displaced, the container 100 being static (this mode is sometimes referred to as a 'scanning' mode). Alternatively or additionally, the motion generation device may cause the container 100 to be displaced, the system 1 being static with respect to the ground. In some embodiments, the throughput, i.e. the number of containers 100 and/or images 10 by unit of time, may be of 20 to 30 images/hour. Alternatively or additionally, in a 'pass-through' mode the system 1 does not include a motion generation device and the container moves with respect to the system 1, the system 1 being static with respect to the ground. In embodiments, the throughput in the pass-through mode may be higher than the throughput in the scanning mode, and may be for example of 50 to 200 images/hour, or even of 50 to a few thousands images/hour in the case of an inspection of a passing train (for example a throughput of more than 1000 images/hour).

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for processing inspection data associated with cargo irradiated by a plurality N of pulses of inspection radiation, the method comprising:
  obtaining the inspection data,
   the inspection data being representative of intensity values of pixels of an inspection image of the cargo generated as a result of a plurality of detectors detecting the plurality N of pulses transmitted through the cargo, and
   the inspection data comprising data associated with a higher energy mode, and data associated with a lower energy mode;
  generating a histogram having, as a first axis, bins corresponding to pixel intensity values HM associated with the higher energy mode and, as a second axis, bins corresponding to pixel intensity values LM associated with the lower energy mode,
  wherein generating the histogram comprises binning, for each pixel (i,j) of the inspection image corresponding to each pulse i and each detector j of the plurality of detectors, an occurrence in the obtained inspection data such that:

$$\left\{ HM(i, j); \frac{LM(i-1, j) + LM(i+1, j)}{2} \right\};$$

selecting, on the generated histogram, for each bin of the pixel intensity values LM, a bin corresponding to a most frequent bin of the pixel intensity values HM; and
  generating a transformation table by mapping each bin of the pixel intensity values LM with the selected bin of the pixel intensity values HM.

2. The method of claim 1, further comprising:
  determining, for each pixel of the inspection image associated with the lower energy mode, whether the intensity value is greater than a predetermined threshold; and
  for each pixel having an intensity value greater than the predetermined threshold, determining a transformed pixel intensity value LM' corresponding to a pixel intensity value HM, using the generated transformation table.

3. The method of claim 2, further comprising:
  for each pixel having an intensity value smaller than the predetermined threshold, determining an average pixel intensity value HM' corresponding to a pixel intensity value HM such that:

$$HM'(i, j) = \frac{HM(i-1, j) + HM(i+1, j)}{2}.$$

4. The method of claim 2, wherein determining the transformed pixel intensity value LM' comprises:
  interpolating mapped bins in the generated transformation table.

5. The method of claim 1, wherein obtaining the inspection data further comprises:
  selecting, in the inspection data, at least one zone associated with a part of the image.

6. The method of claim 5, wherein the part of the image is associated with at least one of: an upper part of the image, a middle part of the image, a lower part of the image.

7. The method of claim 5, wherein the part of the image is associated with a part of the cargo having a constant thickness for the plurality N of pulses.

8. The method of claim 5, wherein obtaining the inspection data further comprises:
  selecting, in the inspection data, at least one zone associated with a part of the cargo having a constant material for the plurality N of pulses.

9. The method of claim 1, further comprising:
  selecting a bin size for a range of intensities based on a number of pixels of the inspection image within the range of intensities.

10. The method of claim 1, wherein obtaining the inspection data further comprises obtaining further data, the further data comprising at least one of:
  inspection data representative of intensity values of pixels of a further inspection image of extra cargo generated as a result of scanning the extra cargo by transmitting a plurality of pulses through the extra cargo, and/or
  calibration data representative of intensity values of pixels of a calibration image generated as a result of scanning a calibration device by transmitting a plurality N of pulses through the calibration device.

11. The method of claim 1, wherein
the data associated with the higher energy mode comprises data generated using a pulse of a higher energy mode, and
the data associated with the lower energy mode comprises data generated using a pulse of a lower energy mode.

12. The method of claim 11, wherein the plurality N of pulses comprises duplets of inspection radiation, each duplet of inspection radiation comprising a pulse of higher energy mode, and a pulse of lower energy mode.

13. The method of claim 1, wherein
the data associated with the higher energy mode comprises data generated using a detector comprising a higher energy mode, and
the data associated with the lower energy mode comprises data generated using a detector comprising a lower energy mode.

14. The method of claim 3, further comprising generating an enhanced inspection image using:
the pixel intensity values HM associated with the higher energy mode; and
at least one of the determined transformed pixel intensity values LM' and/or the determined average pixel intensity values HM'.

15. The method of claim 14, wherein generating the enhanced inspection image comprises, for each pixel intensity value S associated with the lower energy mode LM in the obtained inspection image, using an intensity value V in the enhanced inspection image such that:

$$V = \frac{1}{2}HM' \times \left(\tanh\left(\frac{(T-S)}{W}\right) + 1\right) + \frac{1}{2}LM' \times \left(\tanh\left(\frac{(S-T)}{W}\right) + 1\right)$$

with T being the predetermined threshold value,
LM' being the transformed pixel intensity value calculated from the transformation table corresponding to S,
HM' being the average pixel intensity value corresponding to S, and
W a predetermined width of a transition zone between a predetermined use of LM' and a predetermined use of HM'.

16. An analyser comprising:
a processor; and
a memory storing instructions which, when executed by the processor, enable the processor to carry out a method for processing inspection data associated with cargo irradiated by a plurality N of pulses of inspection radiation, the method comprising:
obtaining the inspection data,
the inspection data being representative of intensity values of pixels of an inspection image of the cargo generated as a result of a plurality of detectors detecting the plurality N of pulses transmitted through the cargo, and
the inspection data comprising data associated with a higher energy mode, and data associated with a lower energy mode;
generating a histogram having, as a first axis, bins corresponding to pixel intensity values HM associated with the higher energy mode and, as a second axis, bins corresponding to pixel intensity values LM associated with the lower energy mode,
wherein generating the histogram comprises binning, for each pixel (i,j) of the inspection image corresponding to each pulse i and each detector j of the plurality of detectors, an occurrence in the obtained inspection data such that:

$$\left\{HM(i, j); \frac{LM(i-1, j) + LM(i+1, j)}{2}\right\};$$

selecting, on the generated histogram, for each bin of the pixel intensity values LM, a bin corresponding to a most frequent bin of the pixel intensity values HM; and
generating a transformation table by mapping each bin of the pixel intensity values LM with the selected bin of the pixel intensity values HM.

17. A non-transitory storage medium stored with a program which, when executed by a processor, enables the processor to carry out the method of claim 1.

* * * * *